(12) United States Patent
Dukaj (10) Patent No.: US 10,005,221 B2
(45) Date of Patent: Jun. 26, 2018

(54) METHOD FOR PRODUCING A CONTAINER FROM THERMOPLASTIC MATERIAL

(71) Applicant: Kautex Textron GmbH & Co. KG, Bonn (DE)

(72) Inventor: Dervish Dukaj, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 212 days.

(21) Appl. No.: 14/785,534

(22) PCT Filed: Apr. 15, 2014

(86) PCT No.: PCT/EP2014/057575
§ 371 (c)(1),
(2) Date: Oct. 19, 2015

(87) PCT Pub. No.: WO2014/170302
PCT Pub. Date: Oct. 23, 2014

(65) Prior Publication Data
US 2016/0075074 A1    Mar. 17, 2016

(30) Foreign Application Priority Data
Apr. 17, 2013    (DE) .................. 10 2013 006 594

(51) Int. Cl.
*B29C 49/20* (2006.01)
*B29C 49/00* (2006.01)
(Continued)

(52) U.S. Cl.
CPC ...... *B29C 49/0047* (2013.01); *B29C 47/0054* (2013.01); *B29C 49/04* (2013.01);
(Continued)

(58) Field of Classification Search
None
See application file for complete search history.

(56) References Cited

U.S. PATENT DOCUMENTS 3,821,344 A * 6/1974 Peters ................ B29C 49/50
264/156
5,078,948 A * 1/1992 Troutman .......... B29C 49/60
264/154
(Continued)

FOREIGN PATENT DOCUMENTS

FR    2494176 A1    5/1982
JP    H09216277 A    8/1997
(Continued)

OTHER PUBLICATIONS

English language PCT International Search Report dated Aug. 13, 2014, received in corresponding PCT Application No. PCT/EP14/57575, 2 pgs.
(Continued)

*Primary Examiner* — Monica Huson
(74) *Attorney, Agent, or Firm* — Grossman, Tucker, Perreault & Pfleger, PLLC (57) ABSTRACT

The invention relates to a method for producing a container from thermoplastic material having a connection element (5) passing through the wall thereof. The method comprises making available at least one plate-shaped or shell-shaped or tube-shaped preform (3) made of plasticized thermoplastic material, introducing the preform (3) into a multipart molding tool (1) having cavities defining at least one molding recess, molding and final shaping of the preform (3) within the molding tool (1) using differential pressure, piercing of the still warm-plastic preform (3) from the tool side by means of a mandrel (9) in order to produce an opening (6) in the preform (3), insertion from the molding recess side of a connection element (5) into the opening (6) produced by the mandrel (9), and connection of the connection element (5) to the preform (3).

9 Claims, 6 Drawing Sheets

(51) Int. Cl.
*B29C 49/04* (2006.01)
*B29C 49/42* (2006.01)
*B29C 49/50* (2006.01)
*B29C 51/12* (2006.01)
*B29C 51/32* (2006.01)
B29C 47/00 (2006.01)
B29L 31/00 (2006.01)
B29C 49/22 (2006.01)
B29C 51/02 (2006.01)
B29C 51/14 (2006.01)
B29C 51/26 (2006.01)
B29C 49/02 (2006.01)
B29C 49/58 (2006.01)
B29K 101/12 (2006.01)
B29K 105/00 (2006.01)

(52) U.S. Cl.
CPC .......... *B29C 49/20* (2013.01); *B29C 49/4278* (2013.01); *B29C 49/50* (2013.01); *B29C 51/12* (2013.01); *B29C 51/32* (2013.01); *B29C 47/0019* (2013.01); *B29C 47/0023* (2013.01); *B29C 47/0066* (2013.01); *B29C 49/221* (2013.01); *B29C 51/02* (2013.01); *B29C 51/14* (2013.01); *B29C 51/267* (2013.01); *B29C 2049/023* (2013.01); *B29C 2049/024* (2013.01); *B29C 2049/2008* (2013.01); *B29C 2049/2047* (2013.01); *B29C 2049/2073* (2013.01); *B29C 2049/2095* (2013.01); *B29C 2049/503* (2013.01); *B29C 2049/5848* (2013.01); *B29C 2049/5865* (2013.01); *B29C 2049/5868* (2013.01); *B29C 2049/5875* (2013.01); *B29C 2791/006* (2013.01); *B29C 2791/007* (2013.01); *B29C 2793/0018* (2013.01); *B29C 2793/0045* (2013.01); *B29C 2793/0063* (2013.01); *B29K 2101/12* (2013.01); *B29K 2105/256* (2013.01); *B29K 2995/0067* (2013.01); *B29K 2995/0069* (2013.01); *B29L 2031/7172* (2013.01)

(56) References Cited

U.S. PATENT DOCUMENTS

| | | | |
|---|---|---|---|
| 5,795,533 A | 8/1998 | Mehnert | |
| 5,863,489 A * | 1/1999 | Flood | B29C 49/60 264/504 |
| 6,375,891 B1 * | 4/2002 | Nishikawa | B29C 49/50 264/155 |
| 6,860,398 B2 | 3/2005 | Potter et al. | |
| 7,867,420 B2 * | 1/2011 | Wolter | B29C 49/20 264/154 |
| 8,894,909 B2 * | 11/2014 | Izquieta Anaut | A43B 13/04 251/366 |
| 8,968,643 B2 | 3/2015 | Lichtenauer et al. | |
| 2011/0140314 A1 | 6/2011 | Grauer | |
| 2012/0161371 A1 * | 6/2012 | Lichtenauer | B29C 49/20 264/523 |
| 2013/0099425 A1 * | 4/2013 | Klein | B29C 49/18 264/540 |
| 2014/0014663 A1 | 1/2014 | Eulitz et al. | |

FOREIGN PATENT DOCUMENTS

| | | |
|---|---|---|
| WO | 2007000454 A1 | 1/2007 |
| WO | 2007090453 A2 | 8/2007 |
| WO | 2008145246 A1 | 12/2008 |

OTHER PUBLICATIONS

English language PCT International Written Opinion dated Aug. 13, 2014, received in corresponding PCT Application No. PCT/EP14/57575, 7 pgs.

English language PCT International Preliminary Report on Patentability dated Aug. 24, 2015, received in corresponding PCT Application No. PCT/EP14/57575, 17 pgs.

* cited by examiner

METHOD FOR PRODUCING A CONTAINER FROM THERMOPLASTIC MATERIAL

The invention relates to a method for producing a container from thermoplastic material comprising the following method steps:
- making available at least one plate-shaped or shell-shaped or tube-shaped preform made of plasticized thermoplastic material
- introducing at least one preform into a multipart molding tool having preferably at least two cavities defining a molding recess
- molding and final shaping of the preform within the molding tool using differential pressure A method of this kind according to the present invention can be carried out as an extrusion blow molding method, for example. As an alternative, the method can also be carried out as a deep drawing method.

Plate-shaped or shell-shaped preforms of plasticized thermoplastic material according to this invention can be made available by extruding web-shaped, shell-shaped or tube-shaped preforms, for example, wherein the tube-shaped preforms are preferably split at least lengthwise on one side and then introduced into a molding tool in such a way that internal fittings can be joined to the still warm-plastic preform within the molding tool. After the container is finished, these components are arranged within the container and are connected positively and/or materially to the container wall.

The preform or preforms is/are first of all placed against the cavities of the molding tool within the molding tool and are molded and given their final shape in the cavities of the molding tool to produce shell-shaped intermediates. In a further method step, the intermediates are then joined together to form a closed hollow body, e.g. by closing parts of the molding tool, with the shell-shaped intermediates being welded to one another.

The method according to the invention is preferably a method for producing mobile tanks for a motor vehicle, e.g. for producing fuel tanks or for producing wash-wipe tanks or for producing tanks for a liquid additive.

The method primarily comprises the final shaping of containers using the heat of extrusion of the plasticized thermoplastic material of the preforms. However, it is also possible, within the scope of the invention, to envisage the use of plate-shaped or shell-shaped semifinished products which are replasticized before or during the introduction into the molding tool.

The use of differential pressure according to the invention is to be taken to mean that the at least temporarily closed molding recess formed by the molding tool is subjected to gas pressure and/or that the cavities of the molding tool are evacuated.

The method according to the invention relates particularly to the production of a container from thermoplastic material having at least one connection element passing through the wall thereof.

A method of this kind is known from DE 10 2007 024 667 A, for example. This method comprises the production of a container from thermoplastic material by extrusion blow molding, wherein, during final shaping within a multipart tool, the container is provided with at least one connection element passing through the wall thereof, wherein the wall of the container is pierced while still in the plasticized state by a part of the connection element in such a way that the connection element enters into a material bond with the container wall, at least in partial areas, wherein the connection element is provided with a penetration tip and, during the penetration of the container wall, the connection element is inserted into a die which is provided in the tool and is arranged on the side of the container wall facing away from the connection element. In this method, the connection element is pushed through the container wall or through the preform on the molding recess side. This connection element serves primarily to enable internal fittings, in particular a venting device or the like, arranged on the inside of the finished container to be connected on the outside by means of hoses. Penetration of the wall of the preform during the production of the container offers the advantage that subsequent circular cuts or drill holes in the container wall are avoided. Fuel tanks made of thermoplastic material, in particular, are produced from multilayer co-extrudates with barrier layers for hydrocarbons. The subsequent damage to the barrier layers by the production of openings in the container wall is fundamentally undesirable since the barrier effect of the barrier layer, which prevents diffusion of hydrocarbons, is compromised in these areas.

A method for producing a fuel tank from thermoplastic material and a fuel tank of this kind having connection elements for hoses or the like is known from EP 1 211 196, for example. EP 1 211 196 A1 describes a twin-shell fuel tank made of thermoplastic material having a hydrocarbon barrier layer which is embedded in the tank wall and the shells of which, which are joined together to form the tank, were obtained by thermoforming. To ensure simple attachment of connection elements while retaining high permeation resistance for hydrocarbons, a two-part connection element or a two-part fitting, which comprises at least one outer part and one inner part, is provided in EP 1 211 196 A1, wherein the outer part is welded to the outer wall of the tank and the inner part at least partially penetrates the outer part by displacing and sandwiching the tank wall. This arrangement has the advantage that the tank wall is enclosed and displaced between the components, with the result that the displaced material serves as a seal for the passage. However, the displacement of the material in the method described in EP 1 211 196 A1 makes it necessary to remove the material between the inner part and the outer part, which blocks the passage through the component, by appropriate trimming of the tank after the production thereof, and this is a relatively involved process.

The method known from DE 10 2007 042 667, in contrast, has the disadvantage that the material which is punched out of the wall of the preform by the connection component or a cutting sleeve mounted on the connection component may block the opening of the connection component. At the least, it is necessary to remove the blank of material punched out of the preform after the production of the connection. Moreover, a relatively large punching unit has to be accommodated in the tool. In order to achieve reliable penetration of the preform in the tool, it is necessary to operate with a relatively high force and a relatively high feed rate of the punching unit, and this is relatively expensive.

In addition, a relatively narrow tolerance window has to be maintained in respect of the arrangement of the punching unit relative to the die provided in the tool.

A method according to the preamble of claim 1 is for example disclosed in DE 30 42 926 C2. A method of connecting a component to a molded article is for example disclosed in US 2011/0140314 A1.

It is therefore the underlying object of the invention to provide a method described at the outset for producing a container from thermoplastic material having a connection element passing through the wall thereof, which method does not have the abovementioned disadvantages.

The object is achieved by a method according to the features of claim 1. Further advantageous embodiments of the method according to the invention are covered by the dependent claims.

The method can be summarized to the effect that an opening is produced in the still warm-plastic preform on the tool side, i.e. on that side of the preform which faces the wall of the cavity, and that a connection element is inserted from the molding recess side, i.e. from the inside or from that side of the preform which faces away from the cavity of the tool. The connection element is introduced into this opening, and the connection element is connected positively and/or materially to the subsequent inner wall of the container during this process.

On the one hand, the method according to the invention has the advantage that a large punching unit in the interior of the tool is superfluous and, on the other hand, the method allows the arrangement of the opening and the connection element relative to one another with larger tolerances. The opening produced by the mandrel can have a slight oversize, and sealing of the opening is accomplished by the insertion of the connection element from the inside into the opening produced by the mandrel. During this process, the still warm-plastic material of the preform is displaced in such a way by the joining of the connection element that reliable sealing of the opening produced by the mandrel is ensured.

If the method is carried out using a three-part molding tool having a core or central frame, relatively little space is required on the core or in the central frame for the maneuvering of the connection element.

In the method according to the invention, provision is preferably made for the connection element to be preheated before insertion into the opening, e.g. by means of an infrared heating device, welding mirrors, heating plates or the like.

According to the invention, provision is made for the opening produced by the mandrel to be sized before or during the insertion of the connection element.

Sizing is performed by means of at least one sizing sleeve inserted into the opening from the tool side, for example. By means of this sizing sleeve, the opening concerned can be expanded in a precise manner with a slight oversize. An oversize of this kind can be of the order of a few tenths of a millimeter.

The connection element is expediently inserted by means of a connection stub into the sizing sleeve situated in the opening, whereupon the sizing sleeve is withdrawn from the opening and, during this process or subsequently, the connection element is welded to the preform by means of a collar provided on said connection element.

The sizing sleeve is preferably withdrawn into the cavity only after the welding process has been carried out. During the welding of the connection element, the passage in the connection stub is sealed off by the preform.

By way of example, the connection element can be designed as a "2-component part" with a welding collar, which is compatible with the preform in terms of weldability, whereas the other component of the connection part can consist of a material that cannot be welded to the preform. For example, the welding collar can consist of polyethylene, this being particularly advantageous if the preform has a multilayer wall structure based on polyethylene (HDPE). The connection element itself can be designed as a polyamide nipple, for example. As an alternative, the connection element can be formed from a single thermoplastic material that can be welded to the material of the preform.

In an expedient and advantageous variant of the method, provision is made for the connection element to be connected on the molding recess side to a venting device to be arranged in the container.

The method according to the invention comprises first of all placing the preform or preforms on the cavities of the tool, then against a core or a central frame having supports for internal fittings, possibly by closing the tool, inserting the connection element into the opening produced shortly before in the preform, and joining at least one internal fitting to the preform wall on the molding recess side. After this, the molding tool can be opened again, the core or support frame for internal fittings or central frame is removed from between the molding tool parts having the cavities, and the molding tool is closed again in order to join the preforms into a closed container. In this phase of the method, the molding recess is subjected to gas pressure, e.g. of the order of 5 to 7 bar.

In order to protect any volumes that are to be provided in the container from these pressure peaks during such pressurization of the molding recess, provision is made according to the invention for a pressure equalization of a volume of the venting device to be established via the connection element during a pressurization of the molding recess.

For example, such a pressure equalization can be accomplished by means of the mandrel.

The pressure equalization is expediently carried out while the sizing sleeve is in the opening of the preform. The sizing sleeve ensures a certain sealing of the opening of the preform, and the mandrel can be connected to a blowing pressure line of the molding tool, for example.

Another advantageous variant of the method according to the invention is distinguished by the use of at least one mandrel provided on the tool side, which is arranged in a cavity of the molding tool, coaxially with a sizing sleeve, which can be adjusted relative to the mandrel.

By way of example, the mandrel can be designed as a hollow needle having at least one opening through which media can flow and can be connected to a pressure medium source for pressurizing the molding recess.

The invention is explained below by means of an illustrative embodiment shown in the drawings, in which.

In the figures, the size ratios of the molding tool 1 and of the perforation device 2 are not shown in proportion. The depiction serves only to illustrate the method and, in other respects, is highly simplified.

Figure 1:
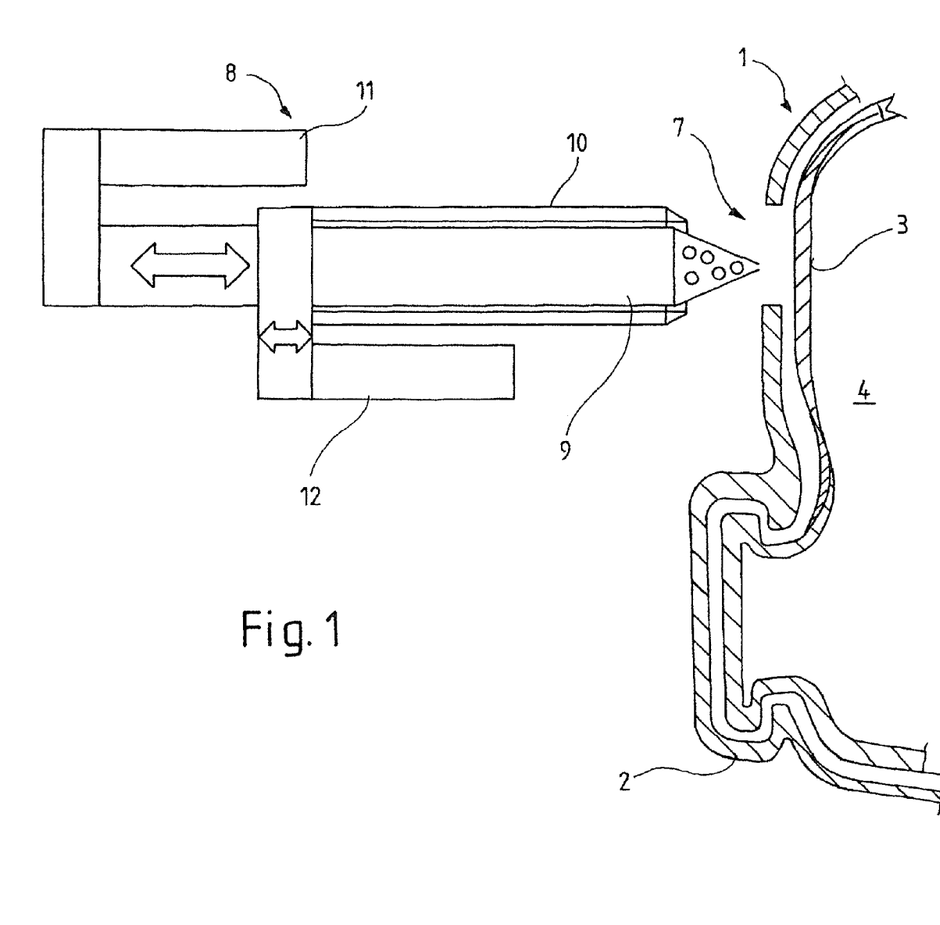
FIG. 1 shows a schematic simplified view of part of a molding tool having a preform inserted into the latter and having a perforation device according to the invention, before the piercing of the preform.

Only part of a wall 2 of the molding tool 1 is shown in FIG. 1. The complete molding tool and, where present, one or more associated extrusion devices, comprising an extruder and at least one extrusion head, a removal device and the like, are not shown for the sake of simplification.

The molding tool 1 can be designed as a blow molding tool, for example, comprising at least two outer molds and a central mold, wherein the individual parts of the blow molding tool are mounted in a conventional manner on mold clamping plates, which are arranged so as to be movable within a closing frame. The outer molds can be moved away from one another and toward one another to produce an opening and closing movement of the blow molding tool. The central mold can be moved transversely to the opening and closing movement. The central mold comprises pneumatically adjustable or movable component holders, for example, by means of which internal fittings can be positioned in the container to be produced. The container according to the invention is expediently designed as a plastic container extruded in multiple layers from a thermoplastic material based on HDPE.

The method explained below with reference to the illustrative embodiment comprises the ejection of web-shaped preforms 3 from at least one extrusion head, wherein the preforms 3 are cut to length between the abovementioned outer molds and the central mold of the molding tool.

In a first method step, the outer molds are closed against a central mold or against a tool divider, the preforms 3 are pulled or pushed into the partial cavities 4 of the molding tool 1, which are formed by the outer molds, by the application of gas pressure and/or by means of an externally applied vacuum. Although a plurality of partial cavities 4 is mentioned here, only one side of the molding tool 1 with one partial cavity 4 is illustrated in the figures.

In the partial cavity 4, the preforms 3 initially adopt the contour of the molding tool 1 predetermined by the partial cavity 4 after initial molding. In a further method step, provision is made to join internal fittings to the preforms 3 on the molding recess side, i.e. on the side of the preforms 3 which faces away from the partial cavities 4. This joining can be accomplished by welding and/or "in situ" riveting, for example. According to the method, provision is made, for example, to introduce a container with an internal venting device comprising vent lines, at least one bubble section and intercommunicating vent lines.

By means of a connection element 5, which will be described below, the vent line arrangement including valves and at least one bubble section is provided with a connection through the subsequent container wall, namely in the form of the connection element 5 (see FIG. 5, for example). For this purpose, the connection element 5 is inserted into a previously produced opening 6 in the preform 3.

For this purpose, reference is made first of all to FIG. 1, which shows part of the wall 2 of the molding tool 1 with a preform 3 inserted. In this state, the preform 3 is at melting temperature and is warm-plastic. Provided in the wall 2 of the molding tool 1, at that point of the preform 3 which is to be perforated, is an aperture 7, behind which a perforation device 8 according to the invention is provided on the tool side.

The perforation device 8 comprises a mandrel 9, which is designed as a hollow needle, and a sizing sleeve 10, which is arranged concentrically and coaxially with the mandrel 9. The mandrel 9 and the sizing sleeve 10 are provided with a first and a second feed device 11 and 12, by means of which the mandrel 9 and the sizing sleeve 10 are arranged in such a way as to be movable jointly and relative to one another. The feed devices 11, 12 can have pneumatic cylinders and a corresponding actuating mechanism, for example. As an alternative, these can, for example, also be designed as electric drives, e.g. in the form of stepping motors. The feed devices 11, 12 can likewise be driven hydraulically.

The mandrel 9 and the sizing sleeve 10 can be moved into the partial cavity 4 through the aperture 7 in the wall 2 of the molding tool 1.

In the method according to the invention, it is envisaged that pre-shaping or placing of the preforms 3 in the partial cavities 4 of the molding tool 1 is followed by the production of an opening 6 by means of the perforation device 8 to accommodate the connection element 5, at least in the case of one preform 3. In this process, the mandrel 9 is first of all driven or pushed through the aperture 7 into the partial cavity 4, piercing the preform 3. The mandrel 9 is designed as a hollow needle with a needle tip 13 which has a plurality of media passages, e.g. in the form of holes.

Figure 2:
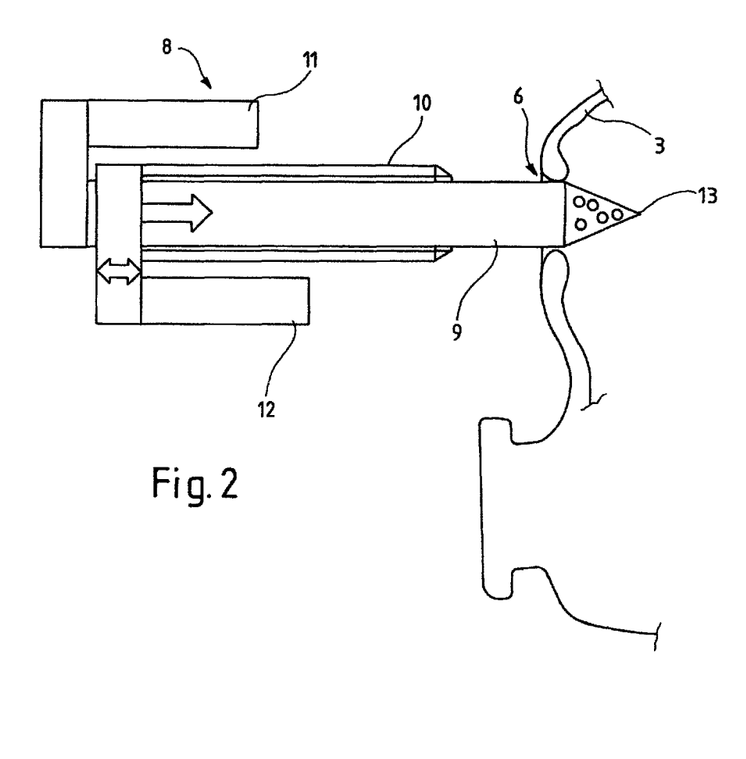
FIG. 2 shows a view corresponding to FIG. 1 during the piercing of the preform.

The process of driving in the mandrel 9 is illustrated in FIG. 2. This does not involve any punching of material out of the preform 3 but only piercing the preform 3. This has the advantage, in particular, that no material is separated from the preform 3, which would stray within the finished container in some circumstances.

Figure 3:
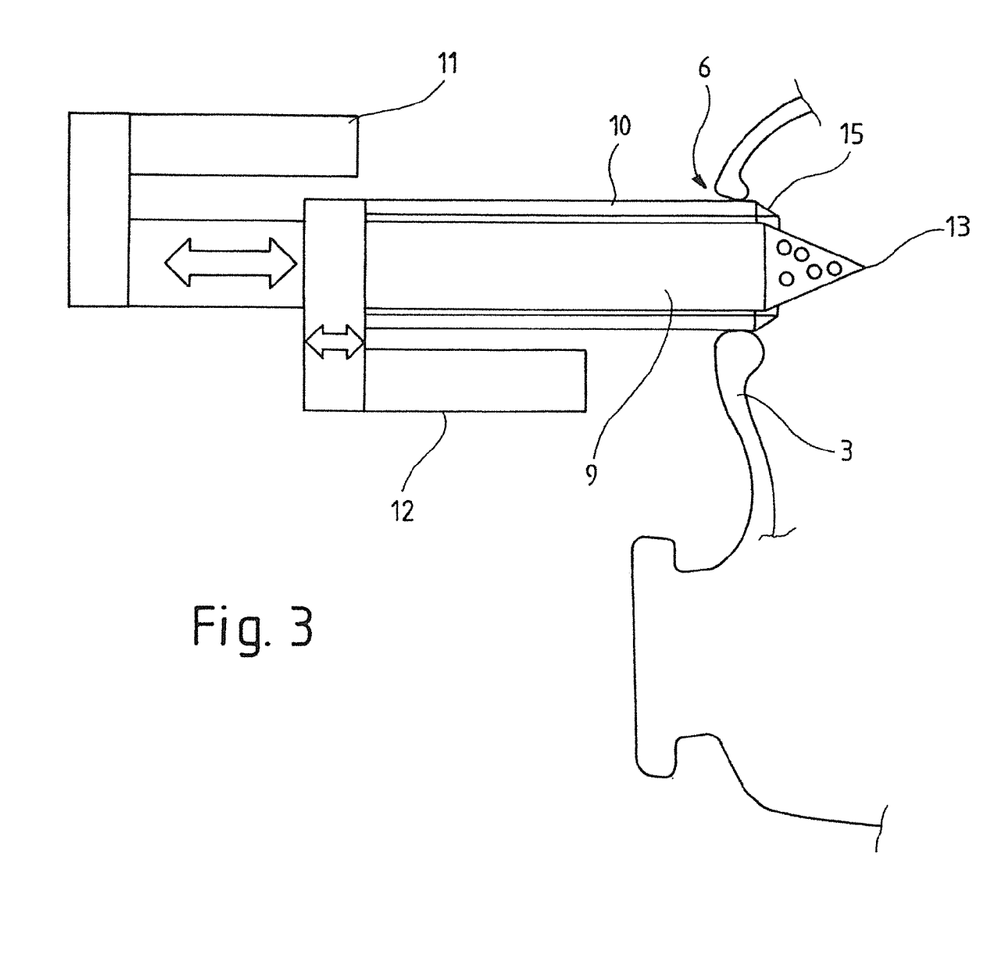
FIG. 3 shows a view corresponding to FIG. 1 during the sizing of the opening.

After the driving in of the mandrel 9, the sizing sleeve 10 is also pushed, by means of the feed device 12, into the opening 6 thus produced, wherein the sizing sleeve 10 has a larger diameter than the mandrel 9 and is provided at its leading end with an encircling outward-beveled rim 15. The sizing sleeve 10 displaces the material of the preform 3 in order to produce the opening 6 with a defined outside diameter (see FIG. 3).

Figure 4:
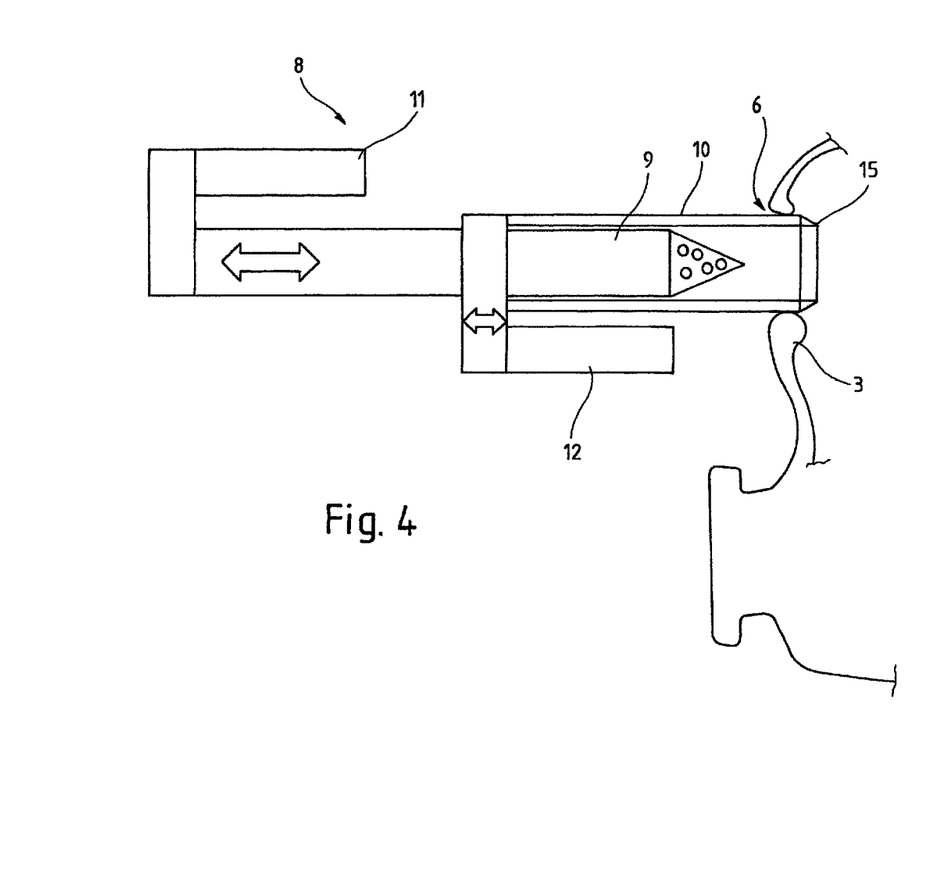
FIG. 4 shows a view corresponding to FIG. 3 with the mandrel retracted.

After the sizing of the opening 6 in the preform 3, the mandrel 9 is pulled back relative to the sizing sleeve 10, and the sizing sleeve 10 remains in the opening 6 of the preform 3 (see FIG. 4).

Figure 5:
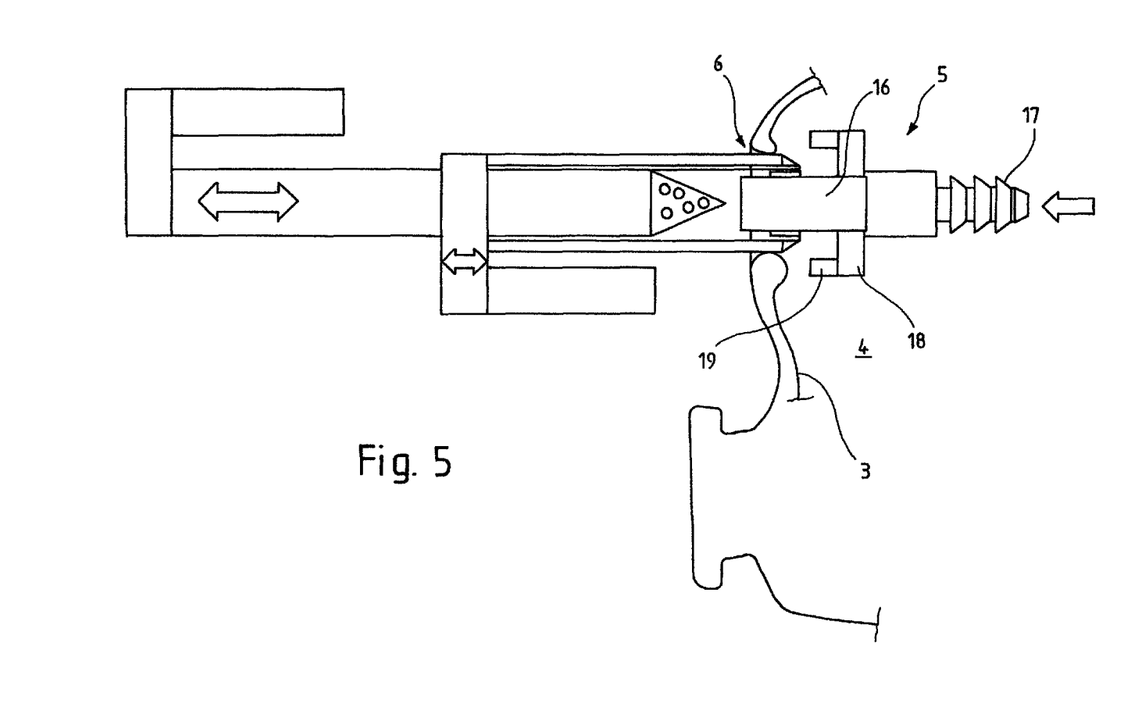
FIG. 5 shows a view corresponding to FIG. 4, which illustrates the insertion of the connection element into the opening.

The connection element 5 is then inserted by means of a connection stub 16 into the opening 6 of the preform 3 by means of a component holder (not shown), which is arranged on the molding recess side, i.e. on the side of the preform which faces away from the wall 2 of the molding tool 1 (see FIG. 5).

The connection element 5 is designed as a "2-component part" in the form of a nipple, which has a firtree profile 17 on the molding recess side and which, on the opposite side, comprises a connection stub 16 projecting from the subsequent container. In the figures, the connection stub 16 is formed as a smooth stub but it could likewise have a firtree profile. The connection stub 16 and the firtree profile 17 of the connection element 8 are designed as a tubular polyamide main body which allows a through flow. The connection element 5 furthermore comprises an encircling collar 18, which is provided with a welding flange 19. The welding flange 19 is preferably composed of an HDPE which is compatible with the HDPE of the preform 13 so as to allow welding.

On the molding recess side, a vent line of a vent valve arrangement is mounted on the firtree profile 17 of the connection element 5. With the vent line pre-fitted, the connection element 5 is pushed into the opening 6 of the preform 3 until the welding flange 19 comes into contact with the preform 3 on the molding recess side. In this process, the connection element 5 is welded to the preform, which is still at melting temperature, in the region of the welding flange 19.

While the sizing sleeve 10 is still in the opening 6 of the preform 3 (after the insertion of the connection element 5 in FIG. 5 and before the retraction of the perforation device 8 in FIG. 6), the central mold is removed from between the outer molds, the outer molds are closed against one another in order to finish the blow-molding of the container to be produced by applying a blowing pressure of about 4 to 7 bar. For this purpose, one or more blowing mandrels are driven into the preform 3. These blowing mandrels are not shown.

The blowing mandrels are supplied with a gaseous pressure medium, e.g. with air, in a conventional manner. The mandrel 9, which is designed as a hollow needle through which media can flow, communicates in such a way with a pressure medium line for applying blowing pressure that some of the pressure medium is introduced via the mandrel 9 into the connection element 5 and into the venting device volumes connected thereto, thereby establishing a pressure equalization with the venting device, such that the final application of blowing pressure cannot cause compression of the volumes or partial volumes of the venting device.

Figure 6:
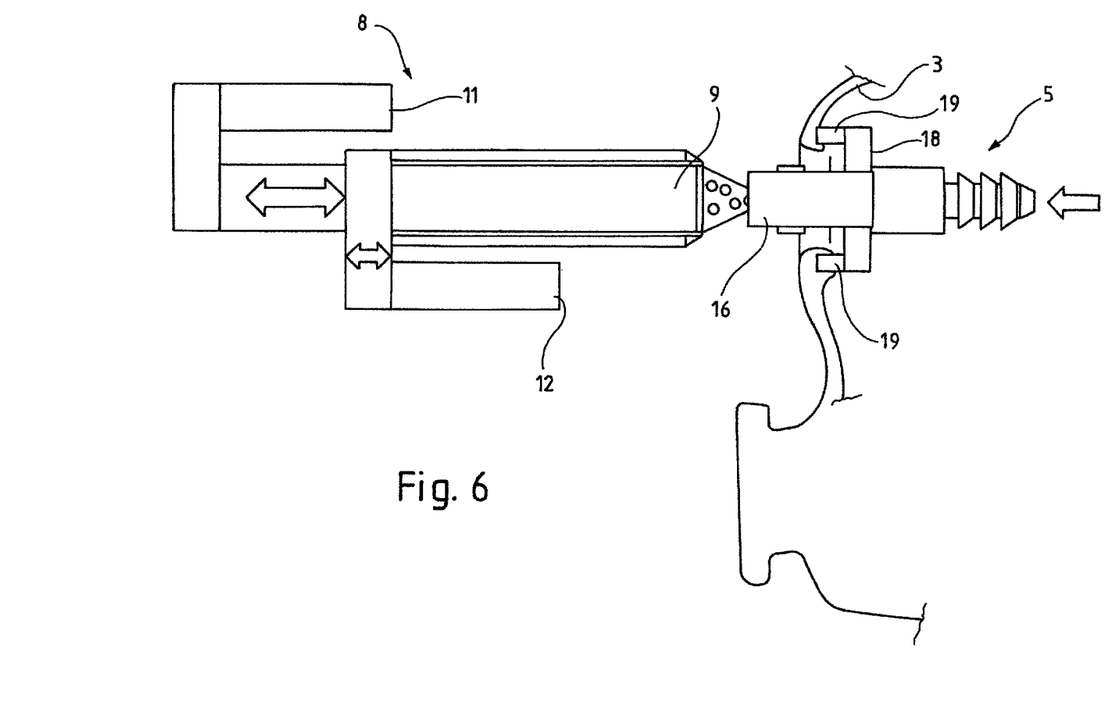
FIG. 6 shows a view corresponding to the previous figures after the welding of the connection element to the preform.

After the final blowing, the perforation device is withdrawn completely from the container or from the preform 3 into the molding tool 1, as illustrated in FIG. 6.

REFERENCE SIGNS 1 molding tool
2 wall of the molding tool
3 preform
4 partial cavities
5 connection element
6 opening
7 aperture
8 perforation device
9 mandrel
10 sizing sleeve
11 feed device
12 feed device
13 needle tip
14 media passages
15 rim
16 connection stub
17 firtree profile
18 collar
19 welding flange

What is claimed is:

1. A method for producing a container from thermoplastic material having a connection element passing through a wall thereof, comprising:
    heating thermoplastic material,
    making at least one preform from the heated thermoplastic material,
    introducing the at least one preform of the heated thermoplastic material into a multipart molding tool having at least one cavity defining at least one molding recess, wherein the heated thermoplastic material has a tool side which faces the at least one cavity and a molding recess side opposite the tool side,
    molding the at least one preform with the multipart molding tool using differential pressure to form shell intermediates,
    joining the shell intermediates to form a hollow body, wherein the shell intermediates are welded to one another,
    piercing the heated thermoplastic material from the tool side by a mandrel to produce an opening in the heated thermoplastic material,
    inserting a connection element into the opening formed in the heated thermoplastic material from the molding recess side, and
    connecting the connection element to the heated thermoplastic material,
        wherein the opening produced by the mandrel is sized before or during the insertion of the connection element into the opening, and
        wherein the sizing is carried out by at least one sizing sleeve inserted into the opening from the tool side.

2. The method as claimed in claim 1, wherein the connection element is inserted into the opening by a connection stub inserted into the sizing sleeve situated in the opening, whereupon the sizing sleeve is withdrawn from the opening and, during the withdrawal of the sizing sleeve or subsequently, the connection element is connected to the heated thermoplastic material by a collar provided on the connection element.

3. The method as claimed in claim 2, wherein the connection element is connected on the molding recess side of the heated thermoplastic material to a venting device arrangeable in the container.

4. The method as claimed in claim 3, characterized in that wherein a pressure equalization of a volume of the venting device is established via the connection element during a pressurization of the at least one molding recess.

5. The method as claimed in claim 4, wherein the pressure equalization is accomplished by the mandrel.

6. The method as claimed in claim 5, wherein the pressure equalization is carried out while the sizing sleeve is in the opening.

7. The method as claimed in claim 1, wherein the at least one mandrel is arranged coaxially with the at least one sizing sleeve, which is adjustable relative to the mandrel.

8. The method as claimed in claim 7, wherein the mandrel comprises a hollow needle having at least one opening through which media is flowable and is connected to a pressure medium source for pressurizing the molding recess.

9. The method as claimed in claim 1, wherein connecting the connection element to the heated thermoplastic material is performed before forming the hollow body.

* * * * *

UNITED STATES PATENT AND TRADEMARK OFFICE
CERTIFICATE OF CORRECTION

PATENT NO. : 10,005,221 B2
APPLICATION NO. : 14/785534
DATED : June 26, 2018
INVENTOR(S) : Dervish Dukaj Page 1 of 1

It is certified that error appears in the above-identified patent and that said Letters Patent is hereby corrected as shown below:

In the Claims

Column 8, Line 34 please delete "characterized in that".

Signed and Sealed this
Twenty-eighth Day of May, 2019

Andrei Iancu
*Director of the United States Patent and Trademark Office*